United States Patent
Knoll

(10) Patent No.: US 6,279,276 B1
(45) Date of Patent: Aug. 28, 2001

(54) PROTECTIVE ASSEMBLY FOR LOADING DOCKS

(76) Inventor: Paul James Knoll, 1115 N. Drew St., Appleton, WI (US) 54911

( * ) Notice: Subject to any disclaimer, the term of this patent is extended or adjusted under 35 U.S.C. 154(b) by 0 days.

(21) Appl. No.: 09/400,440

(22) Filed: Sep. 21, 1999

(51) Int. Cl.[7] ............................................. E06B 9/00
(52) U.S. Cl. ........................... 52/173.2; 49/9; 49/34; 49/65; 160/205; 160/219; 256/1
(58) Field of Search ....................... 52/202, 799.12, 52/664, 173.2; 49/9, 34, 197, 65; 160/201, 205, 179, 219; 256/1, 12.5, 19, 47

(56) References Cited

U.S. PATENT DOCUMENTS

| | | | |
|---|---|---|---|
| 808,813 | * | 1/1906 | Cassidy ........................................ 49/9 |
| 1,689,257 | * | 10/1928 | Sawyer ........................................ 49/9 |
| 1,692,142 | * | 11/1928 | Strauss ........................................ 49/9 |
| 1,692,425 | * | 11/1928 | Strauss ........................................ 49/9 |
| 2,237,106 | * | 4/1941 | Minert ........................................ 49/9 |
| 4,493,164 | * | 1/1985 | Wagner ........................................ 49/65 |
| 4,553,739 | * | 11/1985 | Baines ........................................ 49/34 |
| 5,408,789 | * | 4/1995 | Plfeger ........................................ 52/173.2 |
| 5,564,238 | * | 10/1996 | Ellis ........................................ 52/173.2 |
| 5,649,396 | * | 7/1997 | Carr ........................................ 52/174 |

* cited by examiner

Primary Examiner—Laura A. Callo
(74) Attorney, Agent, or Firm—John P. Halvonik

(57) ABSTRACT

A protective system for overhead doors on loading dock platforms for use in connection with a pair of pipe bollards permanently erected at each of the sides and in front of the door. The system includes a pair of net securing devices each having a mounting bracket allowing the assembly to be attached to the door, a variable linkage, and a bollard collar for fitting over the existing pipe bollard when the door comes down. A spring loaded bracket in connection with the bollard collar and variable linkage allows a netting connected between the bollard collars to move for a distance until the bollard collar abuts the pipe bollard to preclude damage to the door.

2 Claims, 6 Drawing Sheets

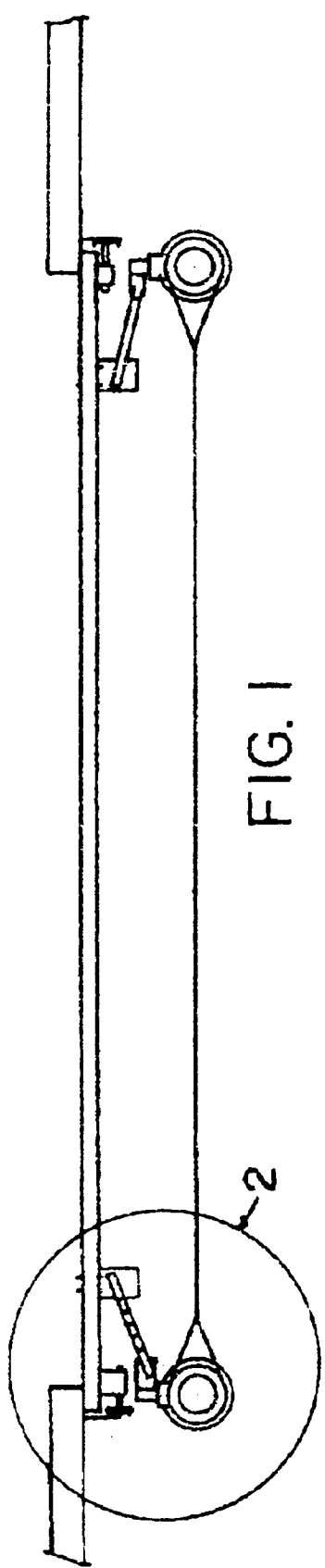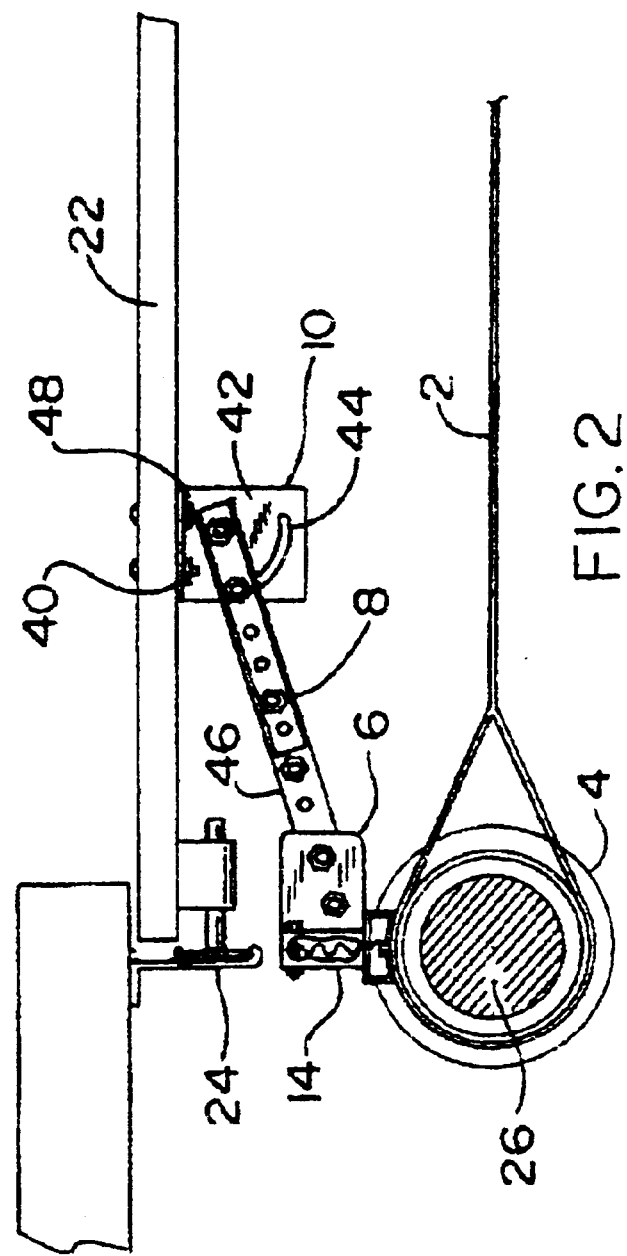

PROTECTIVE ASSEMBLY FOR LOADING DOCKS

FIELD OF THE INVENTION

The invention relates to the field of storage and loading facilities and in particular to a protective apparatus for attachment to the overhead doors found at loading docks to provide a spring loaded safety net in the immediate front of the door to prevent pallets from being pushed into the door and causing damage.

BACKGROUND OF THE INVENTION

Typically loading docks include a raised dock for the loading and unloading of materials which typically come in large quantities in connection with wooden pallets. Most docks have an overhead door that provides access to a garage or similar type of building. Overhead doors are similar to garage doors found in most domestic homes and may be operated manually or automatically by a motor There are also pipe bollards that are typically at one or both sides of the door.

Pipe bollard are typically upright pipes that have been set in cement in order to provide a virtually unmovable upright member that will protect the forklift operator from damaging the wall or door track at one or both sides of the door. Pipe bollards are typically 5" in diameter and are usually about 4 or 5 feet above the ground. They may be a foot or more in advance of the door so that they are right near the edge of the loading dock.

Often forklift operators at a warehouse will put loaded pallets of product in front of a closed overhead door. The overhead doors may be closed since this may be at night when no one is around to wait for loading or unloading. In many cases, the forklift operators will place several rows of pallets in front of a closed door. In the process of putting the palette in place and removing them from this door area, the pallets often come into contact with the door.

This happens because each time the forklift operator moves a pallet the will typically hit the pallet and slide it forward a few inches to ensure that the pallet is on the forks. Damage typically results to the bottom section of the door.

The present invention includes a netting member that has an attachment device with one end attached to the existing door and the other end going over the existing pipe bollard on either side of the door. So, thus, when the door comes down the attachment device will secure a netting across the front of the door area be engaging the pipe bollards. The apparatus will therefore prevent pallets and other objects from coming into contact and therefore damaging an overhead door.

PRIOR ART

While there are protective devices for overhead door used at loading docks, none of them have both the advantage of no manual steps are needed to set the device in place as well as not needing any modification of the existing overhead door.

For example there are breakaway lower panels in the prior art that can be used by replacing the lower part of the overhead doors. However, these need to be fit for each door, are expensive and are still liable to be damaged under some circumstances. The applicant's invention, by contrast, can really be attached to any existing door and the attending pipe bollard since the linkage can be adjusted for various distances between the pipe bollard and the door. The invention is simply attached to the overhead door without having to do further modifications to the door.

For another example, there are portable fences that may be erected temporarily in front of the overhead door. However, such fences need to be manually set every time an unloading operation is anticipated. The invention described herein, by contrast, does not need a separate manual step in order to be set in place. Of course, initially it must be attached to the door but after that it will be set in place, every time the door comes down automatically by the very nature of its construction.

SUMMARY OF THE INVENTION

The invention is a protective assembly for overhead doors on loading docks that is used in connection with pipe bollards that exist in front of the doors and on each side. A mounting bracket allows the assembly to be attached to the door and this is connected by an expandable linkage to an end assembly. The end assembly has a spring loaded bracket that holds a bollard collar that is sized and shaped to go over the existing bollard collar. These parts exist on each side of the door in connection with each of the pipe bollards. Connecting each of these assemblies is a netting that is of relatively sturdy material and is connected at each end to the pipe collar.

When in place, the netting will be strung across the front of the door when the overhead door is moved down by the action of the bollard collars fitting over the pipe bollards. When the netting is struck by pallets the netting will give somewhat to accommodate the space between the bollard collar and the pipe bollard after which the net is stretched taunt and it will no longer give. The door will thus be prevented from being damaged by the movement of the pallet too far forward on the loading dock.

It is an object of the invention to provide a protective device for overhead doors on loading docks by placement of a protective netting in the front of the door that is erected every time the overhead door comes down.

It is an object of the invention to provide a protective device for overhead doors at loading docks that can be set in place automatically every time the overhead door comes down and does not need a separate manual placement step in order to insert that it is in place.

Another object is to provide a protective system for overhead doors on loading docks that can be readily attached to many different types and sizes of overhead doors by means of an adjustable linkage between the pipe bollard attachment and the linkage that is attached to the overhead door.

Other objectives will be known to those skilled in the art once the invention is shown and described.

DESCRIPTION OF THE DRAWINGS

FIG. 1 top view of door and strap assembly;

FIG. 2 detail of linkage and pipe bollard assembly;

DESCRIPTION OF THE PREFERRED EMBODIMENT

Figure 6:
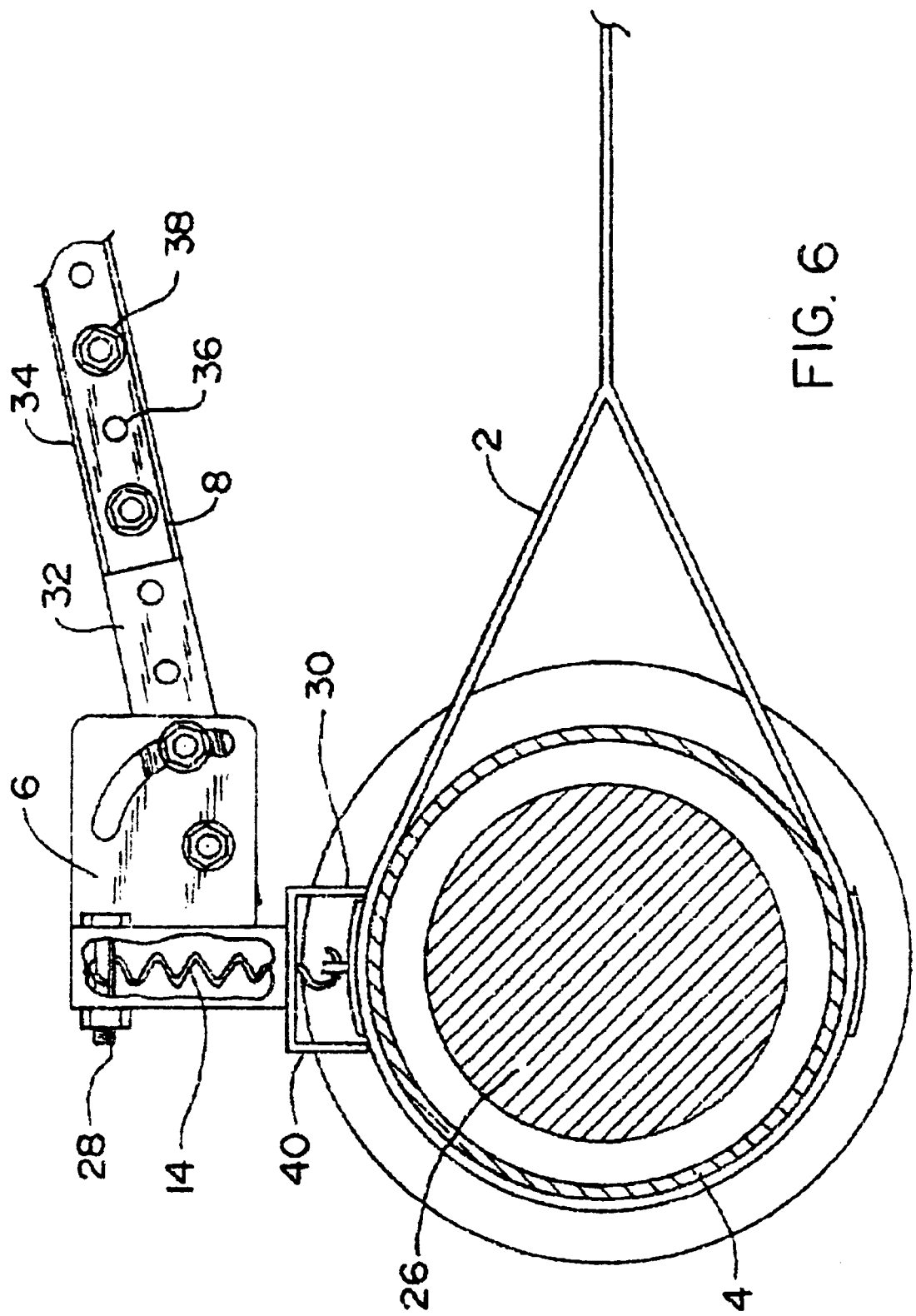
FIG. 6 detail of net clamp and bollard collar with spring extended and net under tension.
Figure 7:
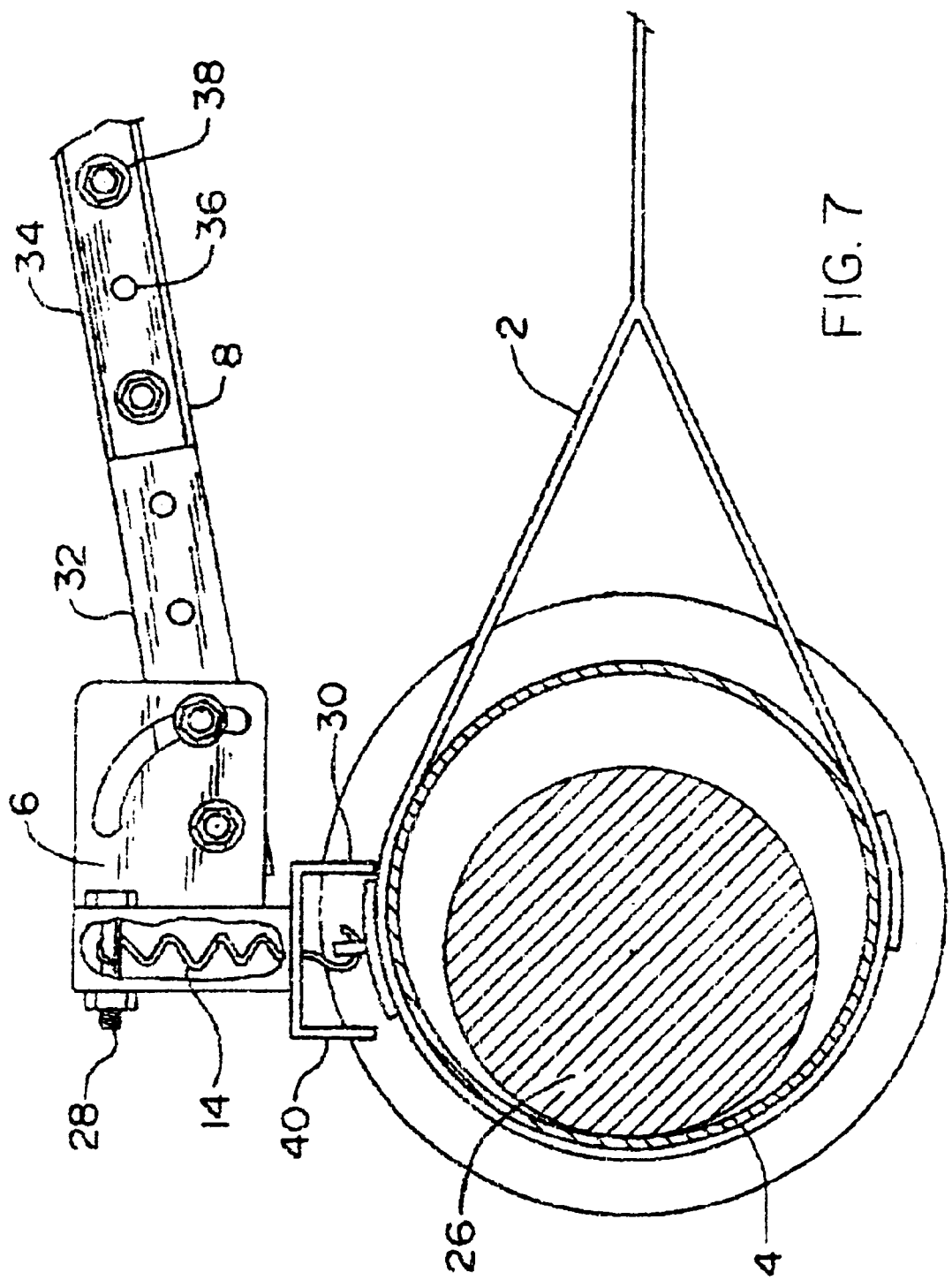
FIG. 7 detail of net clamp and bollard collar in normal position with spring retracted.

The overall construction of the device is shown in FIGS. 1 and 2. There are five major parts known as: the pallet net 2, the bollard collar 4, end assembly 6; the mounting bracket 10 and the expandable linkage 8. The spring mount bolt 28 is used to secure the spring to the end assembly as seen in FIGS. 6 and 7.

All of the above come in pairs with the exception of the net which is, of course, strung across the front of the overhead door area on the loading dock. This pair of assemblies including the bollard collar end assembly, mounting bracket and linkage 8 are found on either side of the roll door 22 and will come in connection through the bollard collar with the pipe bollard when the door comes down. The roll door is on a track 24 or similar state of the art guide used to direct the movement of the roll door downward and upward.

Figure 4:
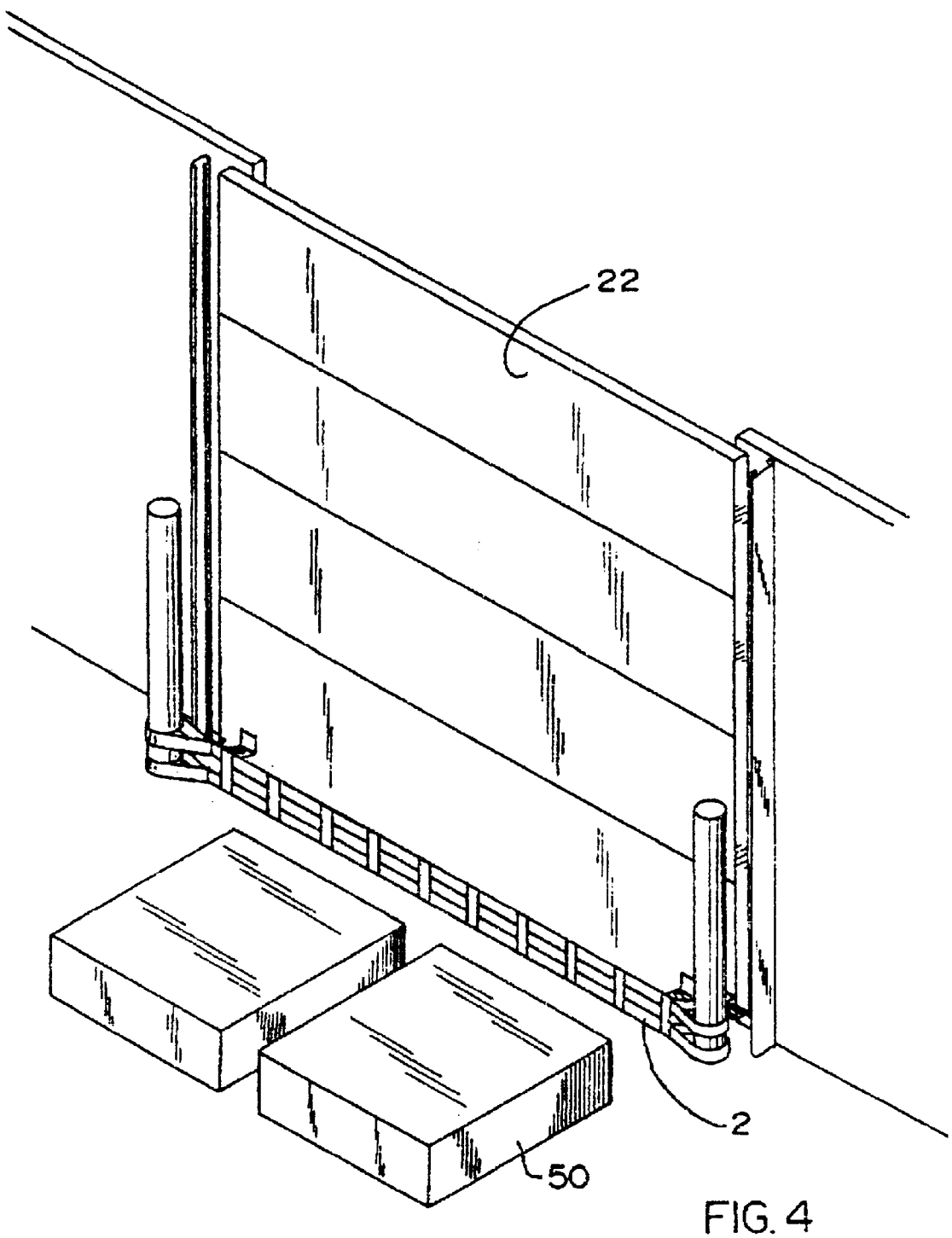
FIG. 4 view of pallets, the protective assembly and the overhead door in the downward, closed position.
Figure 5:
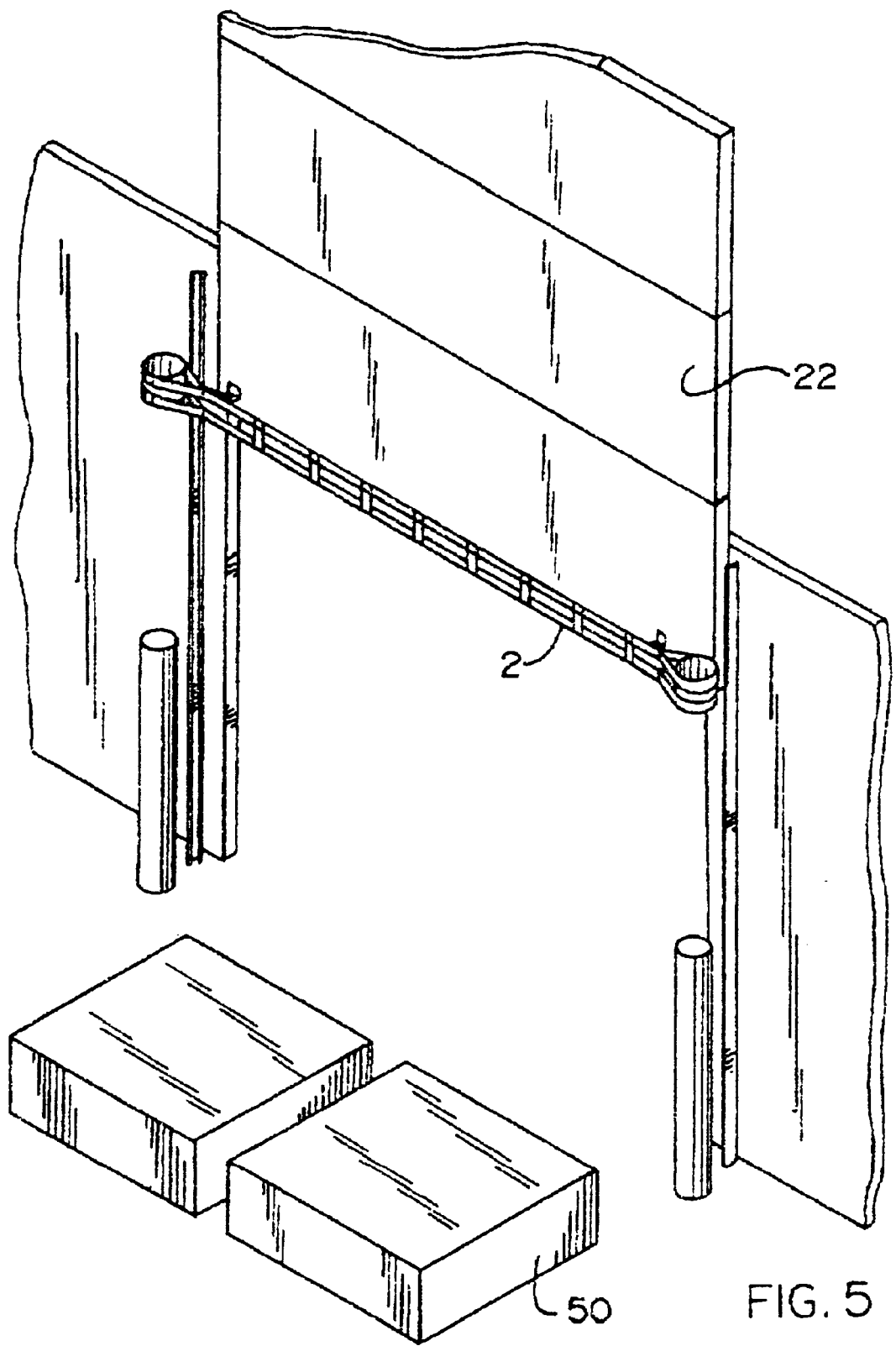
FIG. 5 view of pallets, the protective assembly and the overhead door in the upward, open position.

Each of the bollard collar portions of the device go over the pipe bollards on either side of the door and each end of the netting is connected to each of these collars so that the netting will be strung across the door when the overhead door comes down. The linkage connects the bollard collar to the mounting bracket. Each of the mounting brackets are attached to one side of the door so that the bollard collars can be accommodated over the pipe bollards 26. Most figures only show one for clarity, two are shown in FIGS. 4 and 5.

The linkage 8 provides a variable length connection between the bollard collar and the mounting bracket so that this distance can be varied in order to allow for different distances between the door and the pipe bollard so that the device can be used on existing doors without the need to modify the door or the position of the pipe bollards.

The mounting bracket should have a plate with a series of holes for bolts so that this bracket can be fixed upon the door. Preferably, the plate would be a pair of planar surfaces (40 and 42 in FIG. 3) that are at right angles to one another. One of the surfaces 40 has openings to accommodate the bolts for attachment of the plate to the door, the other 42 has a slot 44 at right angles to the door so that this will allow for adjustment of the linkage that is attached to this plate. The slot allows the expandable linkage to be adjusted in a variety of angles vis a vis the door and the bollard collar in order to accommodate different distances between the door and the pipe bollard.

As can be seen in FIG. 2 the slot in the mounting bracket is of arcuate shape as is that in the end assembly. The use of these curved slots allows the expandable linkages to thus be set in a variety of positions between the mounting bracket and the end assembly. The ends (46, 48) of the linkage are set by setting a bolt through a hole in each end of the linkage and then tightening this bolt to each of the slots.

The linkage itself can be adjusted in length through the use of sliding sections (32 and 34 in FIG. 6) of the linkage and bolts 38 and bolt holes 36 that allow the linkage to be set at the correct position and then tightened in place. The resulting system of the expandable linkage and curved slots allows the device to accommodate the various distances between a wide ranging array of overhead doors and pipe bollards.

The end assembly itself is not only attached to the linkage but also to the bollard collar as seen in FIG. 2. There is a mounting bracket that is adjacent to the bollard collar. Inside the mounting bracket is a spring loaded device 14 that will give some to allow the pipe collar to move for a short distance in the event that the netting is struck or pushed by the stack of pallets. The bracket has been cut away in FIG. 2 to show the spring more clearly.

The bollard collar should be of size and shape to fit over the pipe bollard when the door comes down. The bollard collar should be approximately 1" greater in diameter than the pipe bollard.

Obviously this will be happening to both bollard collars on either side of the netting, so the action described will be taking place in two places. The movement will, of course, be in the direction of the center of the netting when the netting is struck by the pallets 50.

Thus the bollard collar will come in contact with the outside edge of the pipe bollard (that edge of the pipe bollard that is furthest away from the center of the overhead door). This movement will only be enough distance to allow the collar to strike the side of the pipe bollard when this happens. Thus the bollard collar and the netting will give a little, perhaps about an inch, before the bollard collar will abut the side of the pipe bollard and further movement will be prohibited.

Figure 3:
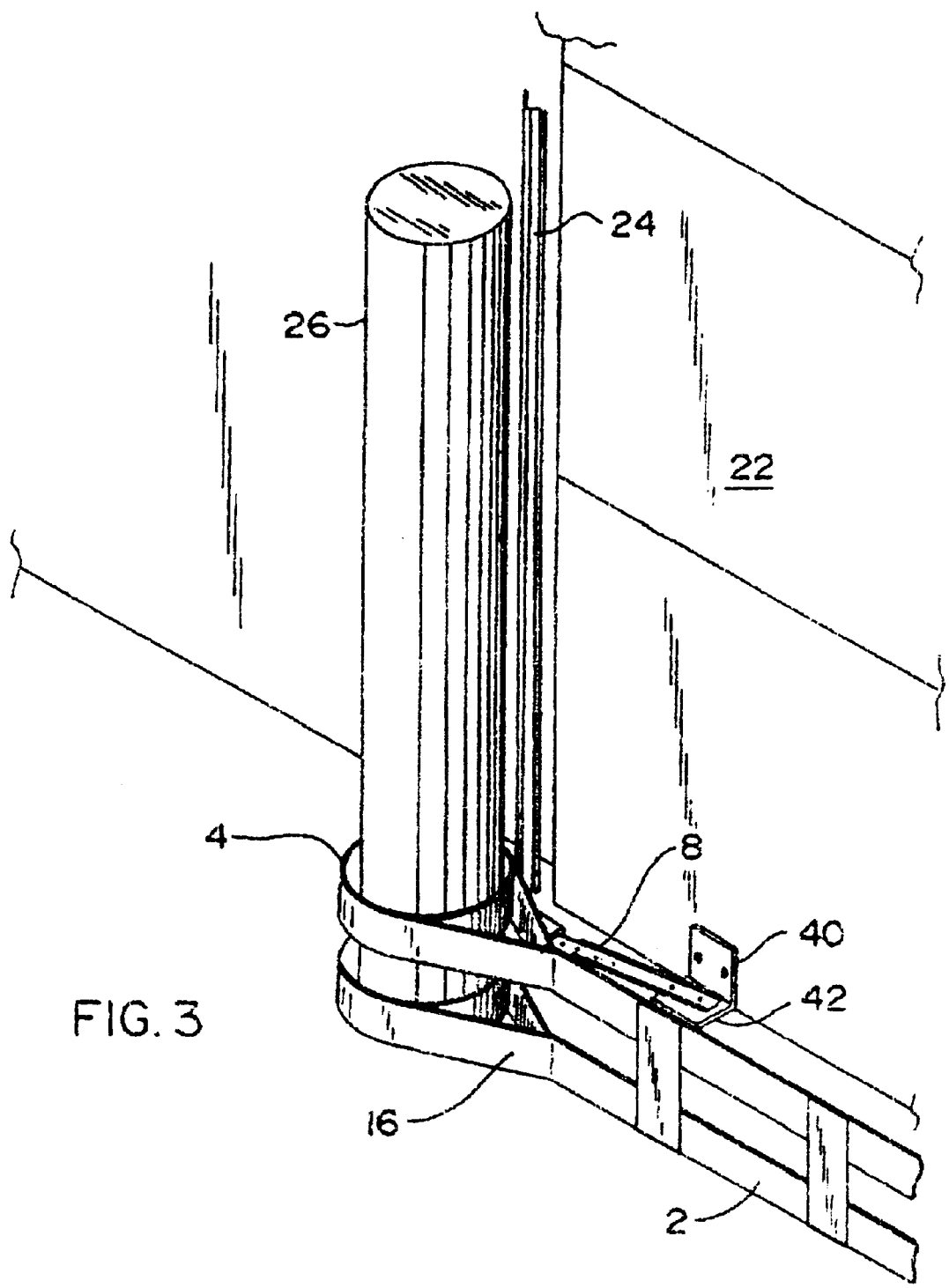
FIG. 3 front view of bollard collar and mounting bracket in place on a door.

The netting is in turn connected on each side to the bollard collars. Preferably, there will be a pair of straps 16 on each side of the netting, a higher strap and a lower strap as can be seen in FIG. 3 and they will connect the netting to the pipe collar.

FIGS. 6 and 7 provide details of the end assembly, bollard collar, net and pipe bollard. In normal position, FIG. 7 there are no objects pushing on the net. FIG. 6 shows the same assembly with an object pushing on the net usually as a result of the crane or lift setting pallets close to or on top of the net. The tension in the net causes the bollard collar to pivot into the pipe bollard as the spring is extended. As the tension is placed on the net, the bollard collar will pivot into the pipe bollard. The pivot point for the bollard collar is the edge where the net clamp 30 and the channel 40 are touching. The spring 14 will extend about $\frac{1}{42}$ inch as the bollard collar rotates and comes into contact with the pipe bollard. When the tension is removed, the spring pulls the bollard collar back into position.

When in use the invention is first attached to the overhead door by bolting the mounting bracket to the door and adjusting the linkage as described above. This will allow the bollard collar to fit over the pipe bollard when the overhead door comes down. This should be placed so that when the door is down, the netting will preferably be about 2 to 4 inches of the ground and strung in front of the door however even this range of distance may vary somewhat. There will be at least 8 inches of horizontal gap between the pallet net and the bottom panel of the door.

After it is mounted the operator of the door merely has to raise or lower the door and it will be set in place by virtue of the pipe bollards and the bollard collars. In the event that the netting is struck by the pallets, the net will give only enough to ensure that the collar will abut the outside edge of the pipe bollard and this will prevent further movement of the netting and preclude damage to the door.

When the pallet(s) have been removed, the net will thus retract back in place by an inch or so (really about ½" on either side as this is the amount of space between the pipe and the collar) to allow the bollard collars and the net to resume their normal position. The force of the spring in the mounting bracket will provide the force to accomplish this.

Note: that the net can also be used with more than two straps at each end. Three straps or perhaps more straps are possible without varying from the spirit of the invention.

I claim:

1. A protective system for overhead doors in loading dock platforms, such platforms typically having a pair of pipe bollards permanently erected at each of the sides of the door and in front of the door, the system comprising: a pair of net securing devices, each of said net securing devices comprising: a bracket adapted to be connected to the overhead door, a variable linkage having a pair of ends, one of said ends in connection with said bracket, a bollard collar in connection with said other end of said variable linkage, said bollard collar being of size and shape adapted to fit over the pipe bollard, each of said net securing devices adapted to be connected to the door so that each said net securing device will engage a pipe bollard when the overhead door comes down; a netting having a pair of netting ends, each of said netting ends adapted to be connected to said bollard collar, a spring loaded means adapted to be connected to bollard collar and said linkage, said variable linkage being able to vary in the length of said linkage so as to adjust for differences in the distance between the door and the pipe bollards, said variable linkage being able to be fixed in said length once the distance has been determined.

2. The system of claim 1 wherein said variable linkage comprises at least two sections adapted for sliding in relation to one another, each of said sections having a series of apertures adapted for holding bolts.

* * * * *